US012469973B2

(12) United States Patent
Fang et al.

(10) Patent No.: US 12,469,973 B2
(45) Date of Patent: Nov. 11, 2025

(54) ELECTRONIC DEVICE

(71) Applicant: PEGATRON CORPORATION, Taipei (TW)

(72) Inventors: Chi-Yin Fang, Taipei (TW); Hau Yuen Tan, Taipei (TW); Chao-Hsu Wu, Taipei (TW); Chih-Chien Hsieh, Taipei (TW); Chia-Hung Chen, Taipei (TW); Shao-Chi Wang, Taipei (TW); Chih-Hung Cho, Taipei (TW); Hung-Ming Yu, Taipei (TW); I-Shu Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 77 days.

(21) Appl. No.: 18/583,449

(22) Filed: Feb. 21, 2024

(65) Prior Publication Data

US 2025/0007163 A1 Jan. 2, 2025

(30) Foreign Application Priority Data

Jun. 30, 2023 (TW) ................................ 112124652

(51) Int. Cl.
*H01Q 1/22* (2006.01)
*H01Q 1/48* (2006.01)
(Continued)

(52) U.S. Cl.
CPC ........... *H01Q 5/385* (2015.01); *H01Q 1/2266* (2013.01); *H01Q 1/48* (2013.01); *H01Q 7/00* (2013.01)

(58) Field of Classification Search
CPC .......... H01Q 1/24; H01Q 1/243; H01Q 1/244; H01Q 1/22; H01Q 1/2266; H01Q 1/48; H01Q 5/385; H01Q 7/00
See application file for complete search history.

(56) References Cited

U.S. PATENT DOCUMENTS

| | | | | |
|---|---|---|---|---|
| 2012/0068893 A1* | 3/2012 | Guterman | H01Q 1/2266 | 343/893 |
| 2014/0097993 A1* | 4/2014 | Hotta | H01Q 1/48 | 343/702 |

(Continued)

FOREIGN PATENT DOCUMENTS

| | | |
|---|---|---|
| CN | 111180859 | 5/2020 |
| TW | I525904 | 3/2016 |

(Continued)

*Primary Examiner* — Thai Pham
(74) *Attorney, Agent, or Firm* — J.C. PATENTS

(57) ABSTRACT

An electronic device includes first and second bodies and two antenna modules. The first body includes a first metal housing. The second body is pivotally connected to the first body through two metal hinges and includes a second metal housing, a third metal housing, and a non-metal housing. The non-metal housing is connected to the second metal housing and close to the first body. The two antenna modules are disposed between the second metal housing, the third metal housing, and the non-metal housing, and close to the two metal hinges respectively. Each antenna module includes a radiating part located between the coupling ground part and the corresponding metal hinge and a coupling ground part close to the first metal housing. The coupling ground part, the first metal housing, the metal hinge, the second metal housing, and the third metal housing together form a loop path.

10 Claims, 8 Drawing Sheets

(51) Int. Cl.
*H01Q 5/385* (2015.01)
*H01Q 7/00* (2006.01)

(56) References Cited

U.S. PATENT DOCUMENTS

| | | | | |
|---|---|---|---|---|
| 2014/0361932 | A1* | 12/2014 | Irci | H01Q 1/2266 343/702 |
| 2015/0200443 | A1* | 7/2015 | Lo | H01Q 21/28 343/702 |
| 2017/0373374 | A1* | 12/2017 | Moon | H01Q 1/24 |
| 2019/0356051 | A1* | 11/2019 | Barrera | H01Q 1/44 |
| 2022/0158326 | A1* | 5/2022 | Lai | H01Q 1/2266 |
| 2023/0107947 | A1* | 4/2023 | Wu | H01Q 1/2291 343/702 |
| 2023/0178875 | A1* | 6/2023 | Wu | H01Q 1/48 343/702 |
| 2023/0395984 | A1* | 12/2023 | Barrera | H01Q 1/44 |

FOREIGN PATENT DOCUMENTS

| | | |
|---|---|---|
| TW | 201801392 | 1/2018 |
| TW | I774259 | 8/2022 |
| TW | I785828 | 12/2022 |

* cited by examiner

ELECTRONIC DEVICE

CROSS-REFERENCE TO RELATED APPLICATION

This application claims the priority benefit of Taiwan application serial no. 112124652, filed on Jun. 30, 2023. The entirety of the above-mentioned patent application is hereby incorporated by reference herein and made a part of specification.

BACKGROUND

Technical Field

The disclosure relates to an electronic device, and particularly relates to an electronic device with an antenna arranged in a metal environment but still has good antenna performance.

Description of Related Art

When a screen, a back cover, a keyboard, and a bottom cover of a notebook computer are all metal parts and an antenna is arranged at a rotation axis, these metal parts form a metal environment around the antenna of the notebook computer, so that an antenna signal is shielded by the metal parts, which causes a poor low-frequency performance. In addition, when the rotation axis rotates, the antenna may also reduce its effectiveness due to changes in the surrounding metal environment.

SUMMARY

The disclosure is directed to an electronic device, which has low-frequency signals of low directivity and antenna characteristics of good performance.

The disclosure provides an electronic device including a first body, a second body and two antenna modules. The first body includes a first metal housing. The second body is pivotally connected to the first body through two metal hinges and includes a second metal housing, a third metal housing, and a non-metal housing. The non-metal housing is connected to the second metal housing and close to the first body. The two antenna modules are disposed between the second metal housing, the third metal housing, and the non-metal housing, and respectively close to the two metal hinges. Each antenna module includes a radiating part and a coupling ground part. The radiating part is located between the coupling ground part and the corresponding metal hinge. The coupling ground part is close to the first metal housing. The coupling ground part, the first metal housing, the metal hinge, the second metal housing, and the third metal housing together form a loop path.

Based on the above description, the electronic device of the disclosure uses the coupling ground part, the first metal housing, metal hinges, the second metal housing, and the third metal housing of the two antenna modules to together form two loop paths, so that low-frequency signals of the antenna modules have low directivity and the antenna modules have good antenna performance. In addition, the coupling ground parts are respectively configured between the radiating parts of the two antenna modules, which enhances an isolation between the two antenna modules and make the antenna modules to have low directivity performance at a low frequency. Such a design makes the antenna module to have good antenna performance and low directivity characteristics at low frequencies.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
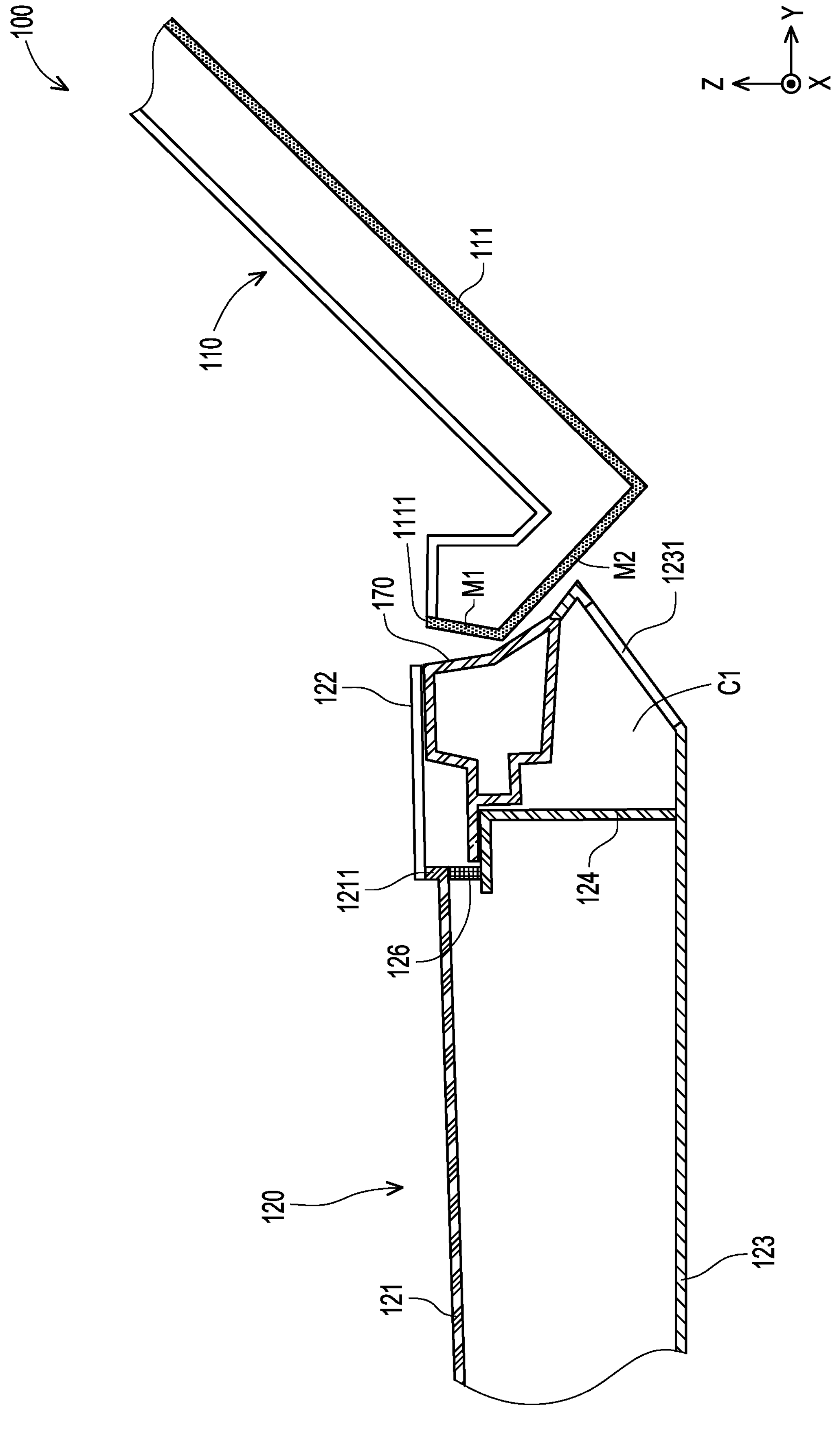
FIG. 1 is a schematic cross-sectional view of an electronic device according to an embodiment of the disclosure.
Figure 2:
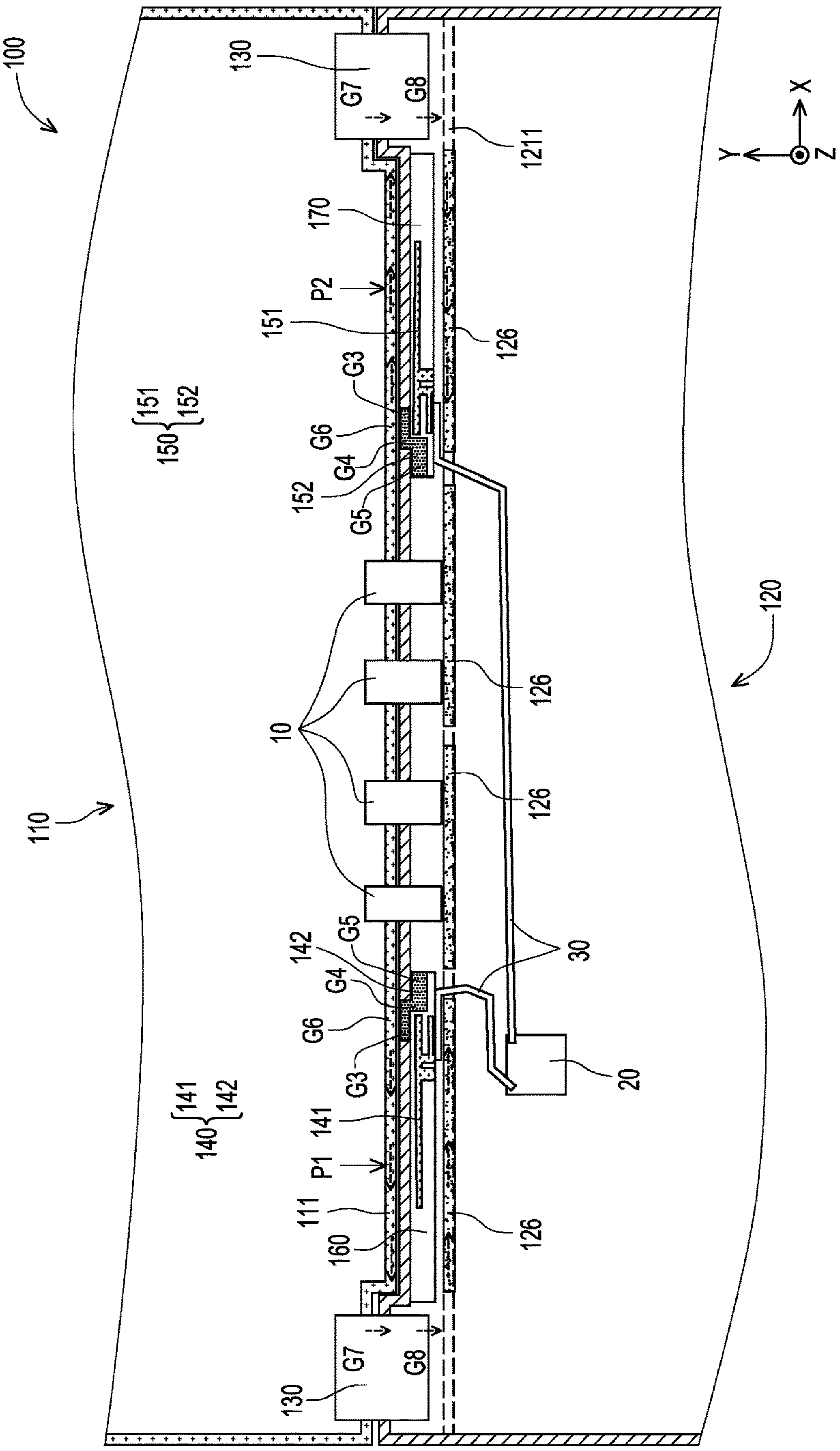
FIG. 2 is a schematic top view of the electronic device in FIG. 1.

FIG. 1 is a schematic cross-sectional view of an electronic device according to an embodiment of the disclosure. FIG. 2 is a schematic top view of the electronic device in FIG. 1. It should be noted that in order to clearly indicate positions of antenna modules 140 and 150 in a second body 120, FIG. 2 does not show a non-metal housing 122 above the antenna modules 140 and 150. In addition, in order to clearly show loop paths P1, P2, a long side 1211 of a second metal housing 121 are drawn by dotted lines.

Referring to FIG. 1 and FIG. 2, an electronic device 100 includes a first body 110, a second body 120 and two antenna modules 140 and 150 (FIG. 2). The first body 110 includes a first metal housing 111, where the first metal housing 111 includes a first section M1 (FIG. 1) and a second section M2 (FIG. 1). The second body 120 is pivotally connected to the first body 110 through two metal hinges 130 (FIG. 2), and includes a second metal housing 121 (FIG. 1), a third metal housing 123 (FIG. 1), and a non-metal housing 122 (FIG. 1). In the embodiment, the electronic device 100 is, for example, a notebook computer. The first metal housing 111 is, for example, a metal back cover of the notebook computer, the second metal housing 121 is, for example, a metal keyboard of the notebook computer, and the third metal housing 123 is, for example, a metal bottom cover of the notebook computer.

The third metal housing 123 is assembled to the second metal housing 121, and the non-metal housing 122 is connected to a long side 1211 of the second metal housing 121 and is close to the first body 110. In an embodiment, the two antenna modules 140 and 150 are respectively printed on antenna brackets 160 and 170 with dimensions of 80 mm×5 mm×5.8 mm and made of plastic through a laser direct structuring (LDS) process. The two antenna modules 140 and 150 are disposed between the second metal housing 121, the third metal housing 123 and the non-metal housing 122, and are respectively close to the two metal hinges 130. It should be noted that, as shown in FIG. 1, the non-metal housing 122 is placed above the antenna brackets 160 and 170. Therefore, the non-metal housing 122 is also close to the two metal hinges 130. In the embodiment, taking the perspective of FIG. 2 as an example, the antenna module 140 and the antenna bracket 160 are located on the left side of the second body 120, and the antenna module 150 and the antenna bracket 170 are located on the right side of the second body 120. The two antenna modules 140 and 150 are respectively connected to two coaxial transmission lines 30 through feeding terminals F1 (FIG. 3B and FIG. 4B), and the other ends of the two coaxial transmission lines 30 are connected to a Wi-Fi module 20.

Referring to FIG. 2, the antenna module 140 includes a radiating part 141 and a coupling ground part 142. The antenna module 150 includes a radiating part 151 and a coupling ground part 152. The radiating part 141 is located between the coupling ground part 142 and the metal hinge 130 on the left side, and the radiating part 151 is located between the coupling ground part 152 and the metal hinge 130 on the right side. In the embodiment, the coupling ground parts 142 and 152 are close to the first metal housing 111, but in other embodiments, the coupling ground parts 142 and 152 may also be connected to the first metal housing 111. The coupling ground parts 142, 152, an uppermost end 1111 of the first section M1 of the first metal housing 111 (FIG. 1), the metal hinge 130, the second metal housing 121 and the third metal housing 123 respectively form two loop paths P1, P2 (from a position G5 to positions G4, G3, G6, G7, G8, a conductor 126 of the second body 120 in sequence).

It should be noted that in the electronic device 100, by respectively disposing the coupling ground parts 142 and 152 between the radiating parts 141 and 151, a low-frequency impedance matching bandwidth of the antenna modules 140 and 150, the antenna performance, and an isolation between the two antenna modules 140 and 150 may be improved. On the other hand, the coupling ground parts 142 and 152 may also reduce noise interference caused by a flexible flat cable 10, such as an FPC flexible flat cable for screen control, to the two antenna modules 140 and 150. Such a design may effectively improve the performance of the two antenna modules 140 and 150 and reduce directivity of low frequencies.

In addition, it should be noted that a distance between the first metal housing 111 and the two antenna modules 140 and 150 may affect the antenna performance of the two antenna modules 140 and 150. As shown in FIG. 1, in the embodiment, a distance between the uppermost end 1111 of the first section M1 of the first metal housing 111 and the non-metal housing 122 is 1.5 mm to 2.5 mm. Moreover, in the embodiment, a junction of the first section M1 and the second section M2 of the first metal housing 111 is closest to the position G3 (FIG. 2) of the antenna modules 140 and 150, and the shortest distance between the junction of the first section M1 and the second section M2 and the position G3 is 0.2-0.5 mm, and such configuration may reduce probability that the two antenna modules 140 and 150 are affected by the first metal housing 111 while still having good performance.

Referring to FIG. 1, the second body 120 further includes a metal retaining wall 124 extending from the third metal housing 123 toward the second metal housing 121. The coupling ground parts 142 and 152 (FIG. 3A and FIG. 4A) are connected to the metal retaining wall 124 through metal parts 125 (FIG. 3A and FIG. 4A), such as screws, and the metal retaining wall 124 is connected to a long side 1211 of the second metal housing 121 close to the non-metal housing 122 through the conductor 126, such as conductive foam. Part of the second metal housing 121, part of the third metal housing 123, the metal retaining wall 124, and the first section M1 and the second section M2 of the first metal housing 111 together surround a cavity C1, and the radiating parts 141, 151 (FIG. 2) are located in cavity C1.

In other words, the electronic device 100 has good antenna performance by integrating the antenna modules 140 and 150 with the metal cavity C1 that forms the antenna resonance.

It should be noted that in the embodiment, the third metal housing 123 as shown in FIG. 1 further includes a heat dissipation opening 1231, and the heat dissipation opening 1231 is separated by a metal connecting column (not shown) with a width of 1 mm to form vents (not shown) with a size of 6 mm×1 mm, and the heat dissipation opening 1231 is provided below the antenna brackets 160 and 170. Such a design may enable the antenna modules 140 and 150 to have good heat dissipation effects.

Figure 3A:
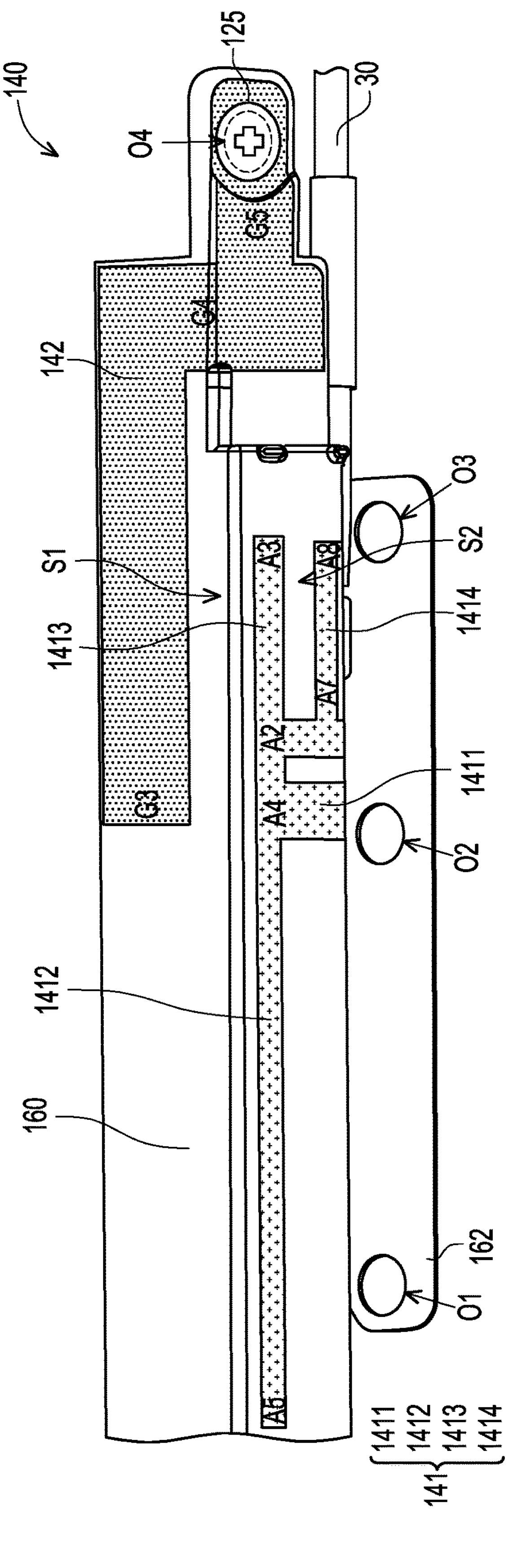
FIG. 3A is a schematic diagram of an antenna module and an antenna bracket on the left side of FIG. 2.
Figure 3B:
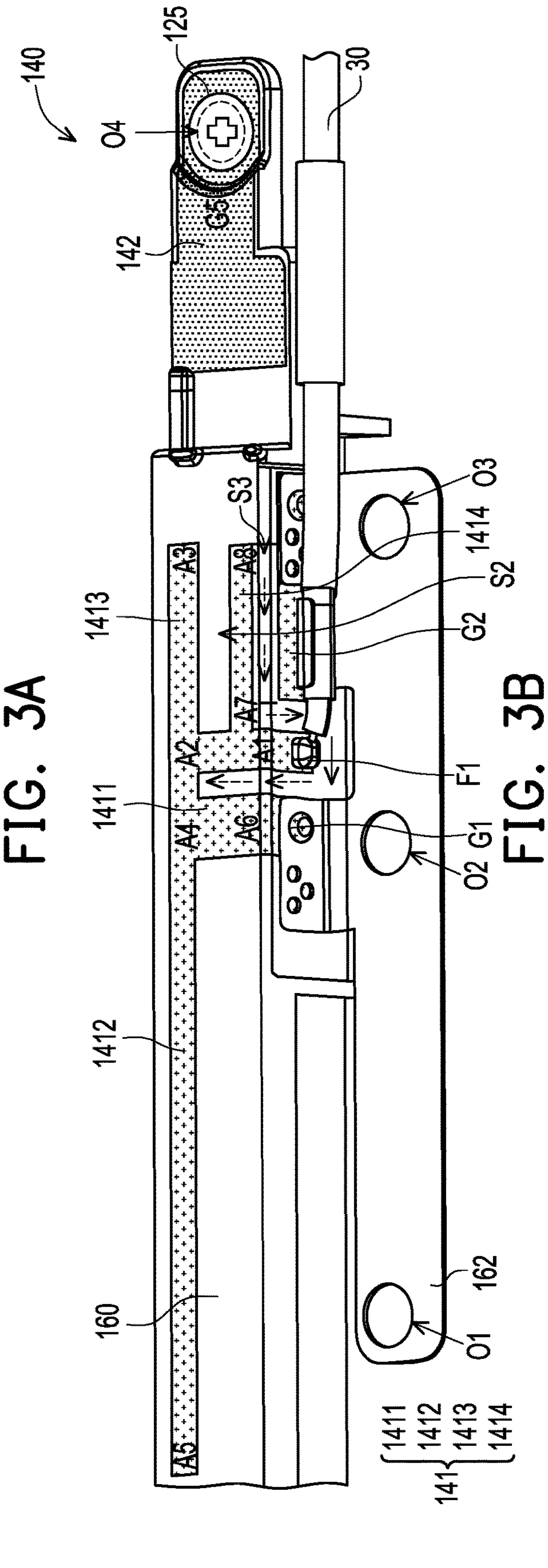
FIG. 3B is a schematic diagram of FIG. 3A from another viewing angle.
Figure 4A:
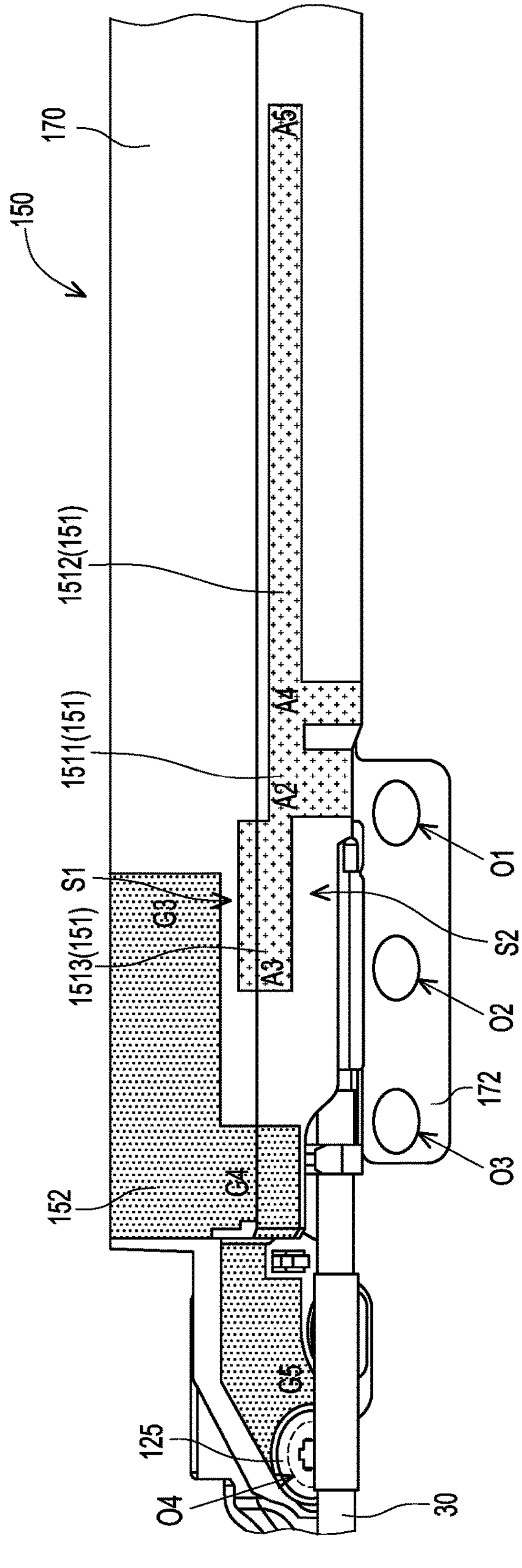
FIG. 4A is a schematic diagram of an antenna module and an antenna bracket on the right side of FIG. 2.
Figure 4B:
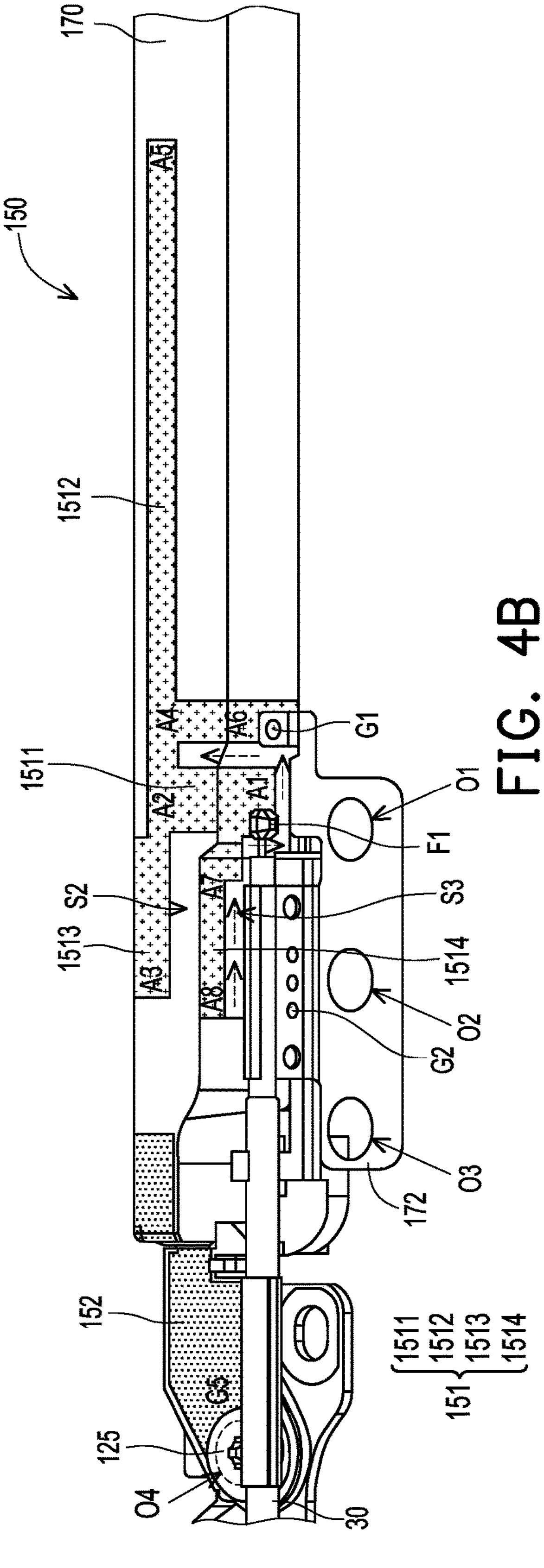
FIG. 4B is a schematic diagram of FIG. 4A from another viewing angle.

FIG. 3A is a schematic diagram of an antenna module and an antenna bracket on the left side of FIG. 2. FIG. 3B is a schematic diagram of FIG. 3A from another viewing angle. FIG. 4A is a schematic diagram of an antenna module and an antenna bracket on the right side of FIG. 2. FIG. 4B is a schematic diagram of FIG. 4A from another viewing angle. It should be noted that the design concepts of the left side antenna module 140 and the right side antenna module 150 are the same, and the antenna modules 140 and 150 are described simultaneously below.

Referring to FIG. 3A, FIG. 3B, FIG. 4A and FIG. 4B, the radiating parts 141 and 151 include the first radiators 1411 and 1511 (path areas from a position A1 to positions A2, A4, A6, G1 and G2 in sequence) and second radiators 1412 and 1512 connected to the first radiators 1411 and 1511 (path areas from a position A4 to a position A5) respectively. The first radiators 1411 and 1511 include the feeding terminals F1 (FIG. FIG. 3B and FIG. 4B) and ground terminals G1 (FIG. 3B and FIG. 4B) located at two opposite ends respectively. The second radiators 1412 and 1512 extend from the first radiators 1411 and 1511 along an edge of the non-metal housing 122 toward the corresponding metal hinges 130 respectively, and the first radiators 1411 and 1511 and the second radiators 1412 and 1512 commonly generate a first low-frequency band and a first high-frequency band. In the embodiment, the first low-frequency band is 2400 MHz to 2500 MHz, and the first high-frequency band is 6000 MHz to 6500 MHZ. In the embodiment, the radiating parts 141 and 151 are planar inverted-F antennas (PIFA), but the disclosure is not limited thereto.

In addition, the radiating parts 141 and 151 further respectively include third radiators 1413 and 1513 (path areas from the position A2 to the position A3), which are respectively connected to the first radiators 1411 and 1511 and extend toward a direction away from the second radiators 1412 and 1512. The first radiators 1411 and 1511 and the third radiators 1413 and 1513 commonly generate a second high-frequency band. In the embodiment, the second high-frequency band is 5000 MHz to 6000 MHz.

The radiating parts 141 and 151 further respectively include fourth radiators 1414 and 1514 (path areas from a position A7 to a position A8), which are respectively connected to the first radiators 1411 and 1511 and arranged in parallel with the third radiators 1413 and 1513. The first radiators 1411 and 1511 and the fourth radiators 1414 and 1514 commonly generate a third high-frequency band. In the embodiment, the third high-frequency band is 6500 MHz to 7500 MHz.

In addition, the loop paths P1 and P2 shown in FIG. 2 respectively generate the second low-frequency band. In the embodiment, the second low-frequency band is 2100 MHz to 2200 MHz.

It should be noted that in the embodiment, the first low-frequency band (2400-2500 MHz) generated by the antenna modules 140 and 150 may be used for a frequency band of Wi-Fi 2.4G (2400-2500 MHz), the second high-frequency band (5000-6000 MHz) frequency band may be used for a frequency band of Wi-Fi 5G (5150-5850 MHz), and the first high-frequency band (6000-6500 MHz) and the third high-frequency band (6500-7500 MHz) may be used for a frequency band of Wi-Fi 6E (5925-7125 MHz).

Referring to FIG. 3A and FIG. 4A, the coupling ground parts 142 and 152 are located on one side of the third radiators 1413 and 1513, and form a first slot S1 with the third radiators 1413 and 1513. In addition, second slots S2 are formed between the fourth radiators 1414 and 1514 and the third radiators 1413 and 1513 respectively.

Referring to FIG. 3B and FIG. 4B, the antenna modules 140 and 150 include ground conductors G2 respectively. The ground conductors G2 are located on one side of the feeding terminals F1 and the fourth radiators 1414 and 1514, and a third slot S3 is formed between the ground conductor G2 and the fourth radiators 1414 and 1514 and the first radiators 1411 and 1511.

It should be noted that by adjusting lengths and widths of the second radiators 1412 and 1512 of the antenna modules 140 and 150, central frequencies of the first low-frequency band and the first high-frequency band may be adjusted, and by adjusting a size of the second slot S2, impedance matching bandwidths of the first low-frequency band and the first high-frequency band are increased. In addition, by adjusting lengths and widths of the third radiators 1413 and 1513 of the antenna modules 140 and 150, a central frequency of the second high-frequency band may be adjusted, and by adjusting a size of the first slot S1 or the second slot S2, an impedance matching bandwidth of the second high-frequency band is increased. In addition, by adjusting lengths and widths of the fourth radiators 1414 and 1514 of the antenna modules 140 and 150, a central frequency of the third high-frequency band may be adjusted, and by adjusting a size of the third slot S3, an impedance matching bandwidth of the third high-frequency band is increased.

Referring to FIG. 3B and FIG. 4B, the respective ground terminals G1 and ground conductors G2 of the antenna modules 140 and 150 are respectively connected to the metal ground members 162 and 172. In the embodiment, the metal ground members 162 and 172 are connected to the ground terminals G1 and the ground conductors G2 in a welding manner. The antenna modules 140 and 150 are respectively locked to screw holes O1-O3 of the metal ground parts 162 and 172 and screw holes O4 of the coupling ground parts 142 and 152 through the metal parts 125, so that the ground terminals G1, the ground conductors G2 and the coupling ground parts 142 and 152 are electrically connected to the metal retaining wall 124 (FIG. 1). Moreover, as shown in FIG. 1, the metal retaining wall 124 is electrically connected to the second metal housing 121 through the conductor 126. Such a design enables a good grounding connection between the antenna modules 140 and 150 and the second metal housing 121.

Figure 5:
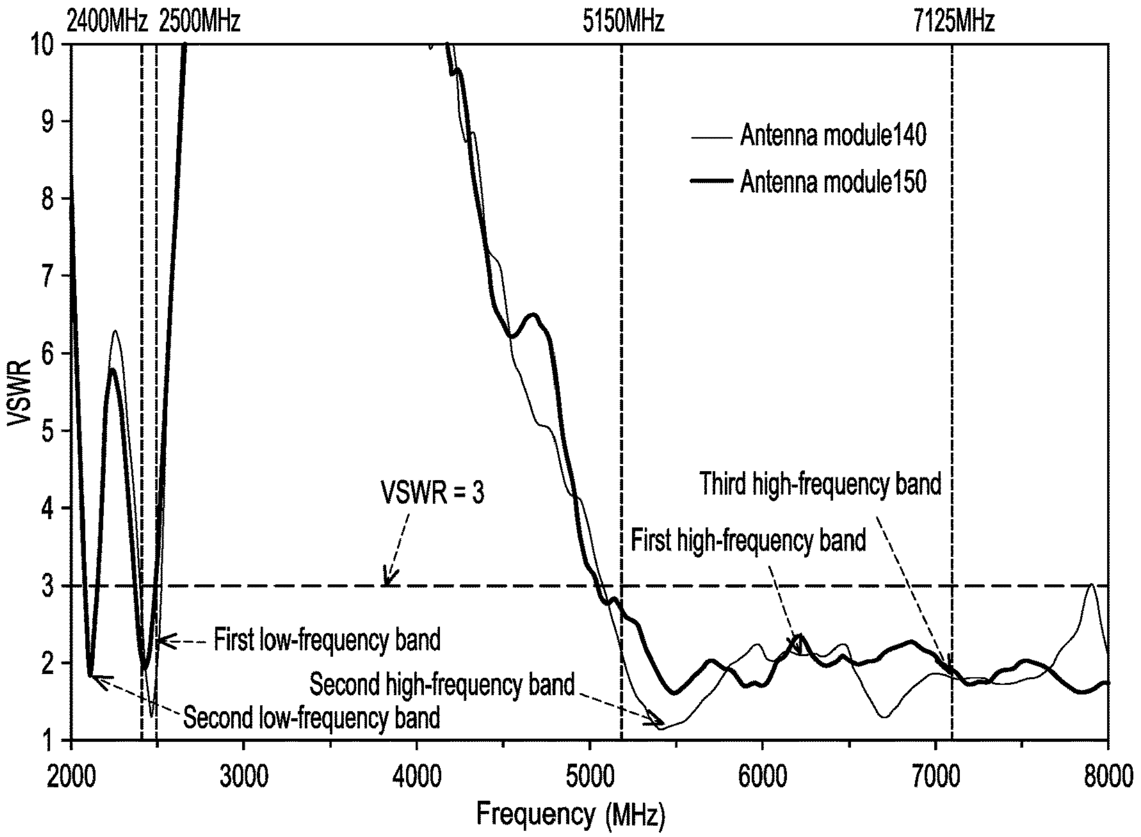
FIG. 5 is a frequency-VSWR relationship diagram of the electronic device of FIG. 1.

FIG. 5 is a frequency-VSWR relationship diagram of the electronic device of FIG. 1. Referring to FIG. 5, in the embodiment, the electronic device 100 has a VSWR of less than 3 at the first low-frequency band (2400-2500 MHz), the second low-frequency band (2100-2200 MHz), the first high-frequency band (6000-6500 MHz), the second high-frequency band (5000-6000 MHz) and the third high-frequency band (6500-500 MHz), and has good performance.

Figure 6:
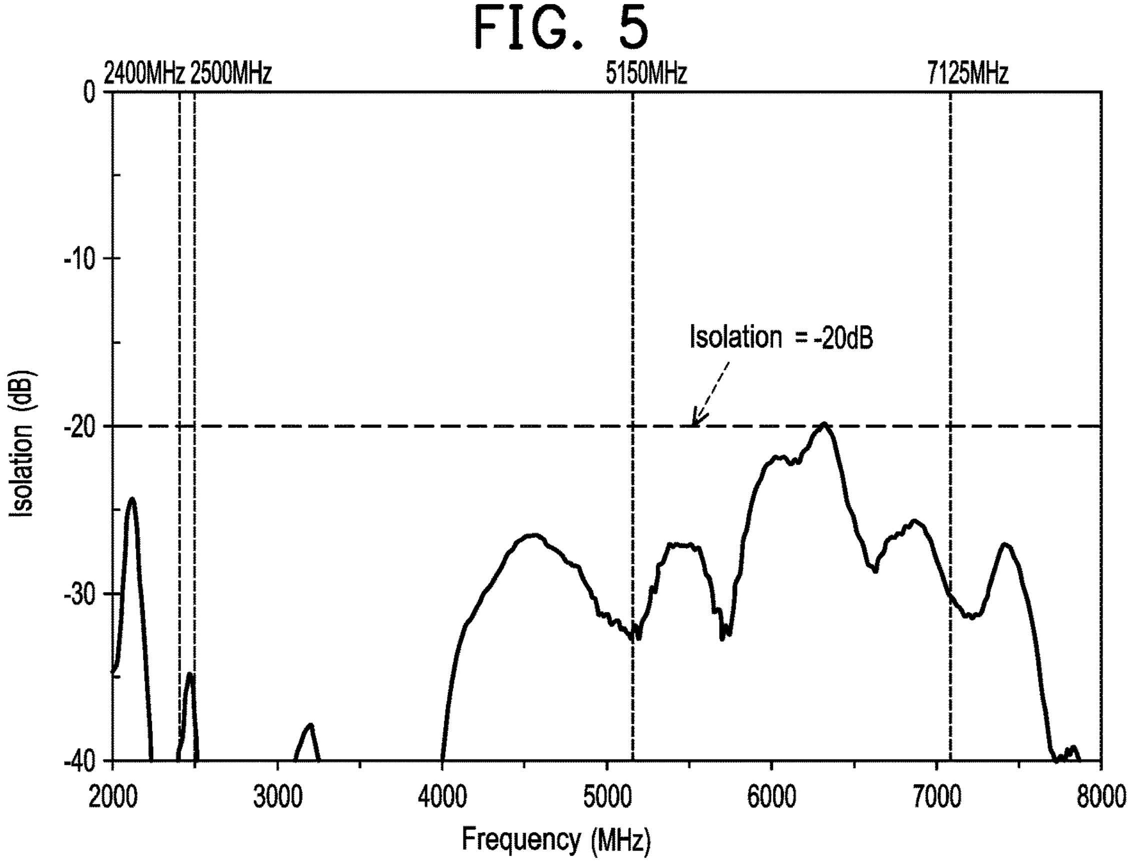
FIG. 6 is a frequency-isolation relationship diagram of the electronic device of FIG. 1.

FIG. 6 is a frequency-isolation relationship diagram of the electronic device of FIG. 1. Referring to FIG. 6, in the embodiment, the two antenna modules 140 and 150 have an isolation of less than −20 dB at 2100-7500 MHz, and have good performance.

Figure 7:
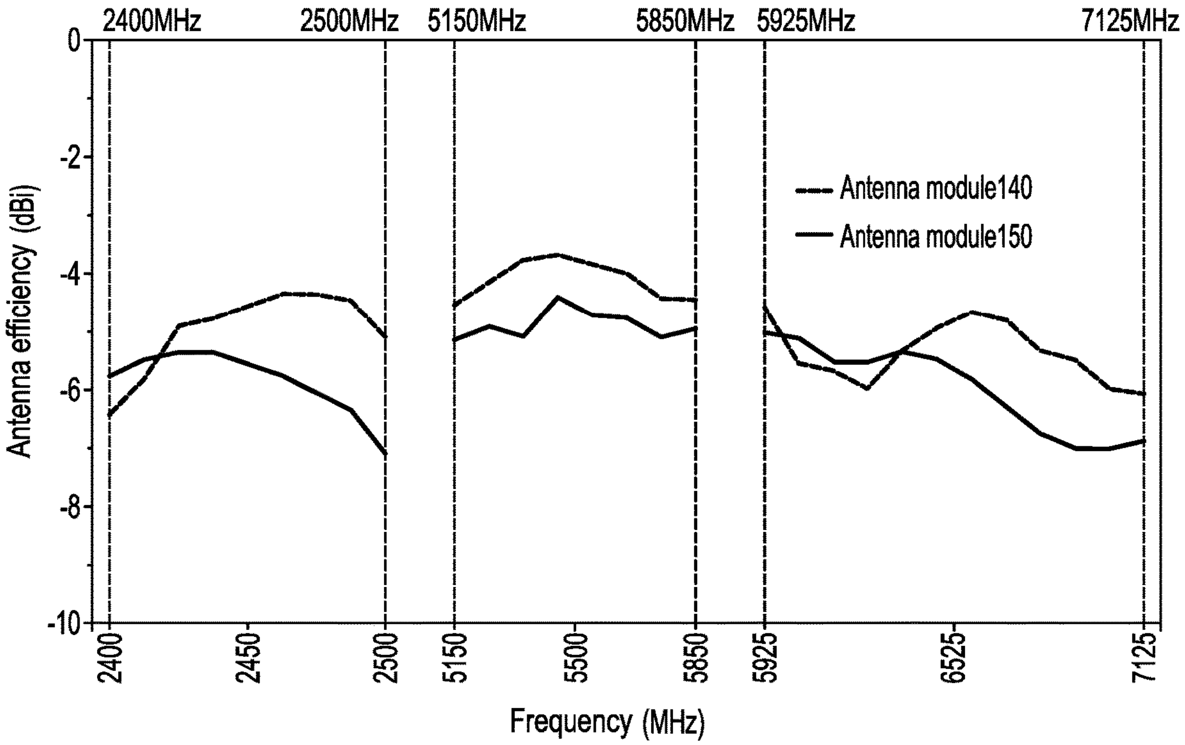
FIG. 7 is a frequency-antenna efficiency relationship diagram of the electronic device of FIG. 1.

FIG. 7 is a frequency-antenna efficiency relationship diagram of the electronic device of FIG. 1. Referring to FIG. 7, in the embodiment, antenna efficiency of the antenna modules 140 and 150 at Wi-Fi 2.4G, i.e., the first low-frequency band (2400-2500 MHz), is-4.4 to-7.1 dBi, and at Wi-Fi 5G, i.e., the second high-frequency band (5000-6000 MHz), the antenna efficiency is −3.7 to −5.2 dBi, and at Wi-Fi 6E, i.e., the first high-frequency band (6000-6500 MHz) and the third high-frequency band (6500-7500 MHz), the antenna efficiency is −4.6 to −7.0 dBi, and has good performance.

In addition, compared to the antenna efficiency of a conventional antenna module, the antenna efficiency of the antenna modules 140 and 150 at Wi-Fi 2.4G may be improved by 2.3-2.6 dBi, the antenna efficiency at Wi-Fi 5G may be improved by 0-2.3 dBi, and the antenna efficiency at Wi-Fi 6E may be improved by 0.8-1.9 dBi. Therefore, compared to the conventional antenna module, the antenna modules 140 and 150 have better antenna efficiency.

Figure 8:
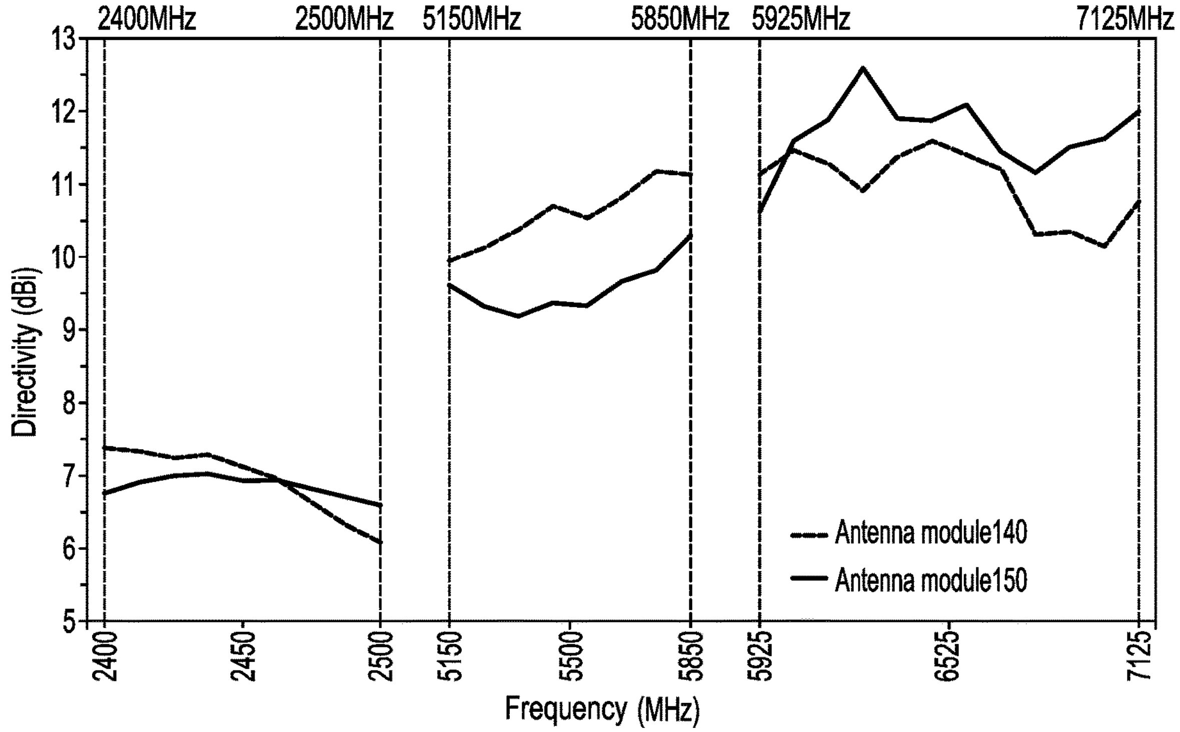
FIG. 8 is a frequency-directivity relationship diagram of the electronic device of FIG. 1.

FIG. 8 is a frequency-directivity relationship diagram of the electronic device of FIG. 1. Referring to FIG. 8, in the embodiment, the directivity of the antenna modules 140 and 150 at Wi-Fi 2.4G, i.e., the first low-frequency band (2400-2500 MHz), is 6.1-7.4 dBi, at Wi-Fi 5G, i.e., the second high-frequency band (5000-6000 MH), the directivity is 9.2-11.2 dBi, and at Wi-Fi 6E, i.e., the first high-frequency band (6000-6500 MHz) and the third high-frequency band (6500-7500 MHz), the directivity is 10.1-12.6 dBi, and has good performance.

In addition, compared with the directivity of the conventional antenna module, the directivity of the antenna modules 140 and 150 at Wi-Fi 2.4G may be reduced by 1.4-1.8 dBi, and compared with the conventional antenna module, the directivity of the antenna module 140, 150 has good performance of low directivity at low frequencies.

Figure 9A:
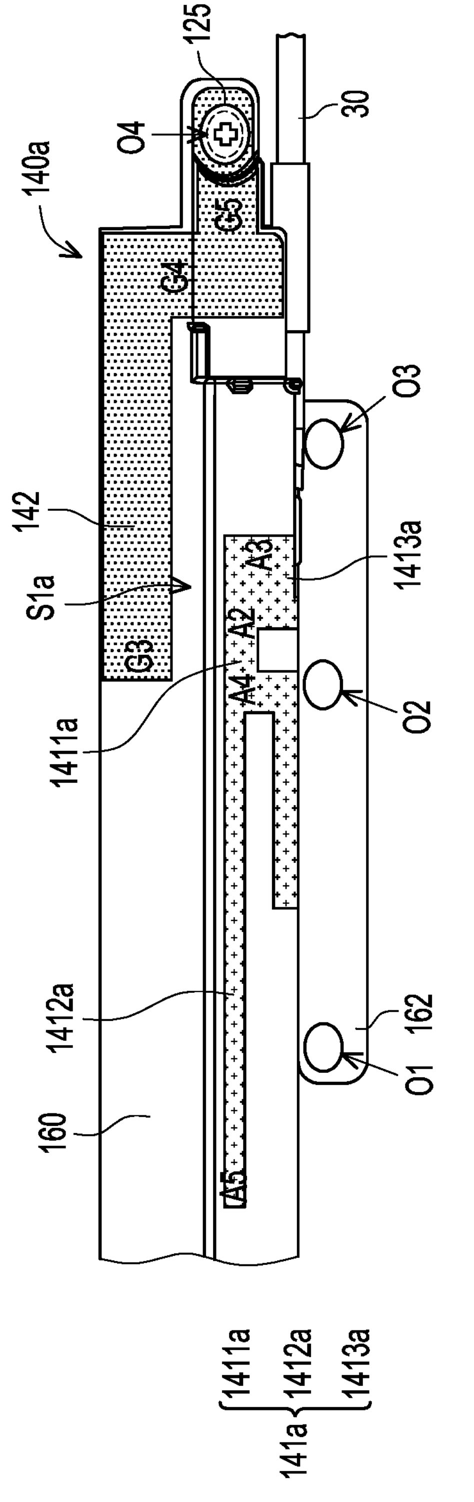
FIG. 9A is a schematic diagram of another embodiment of the antenna module and the antenna bracket on the left side.
Figure 9B:
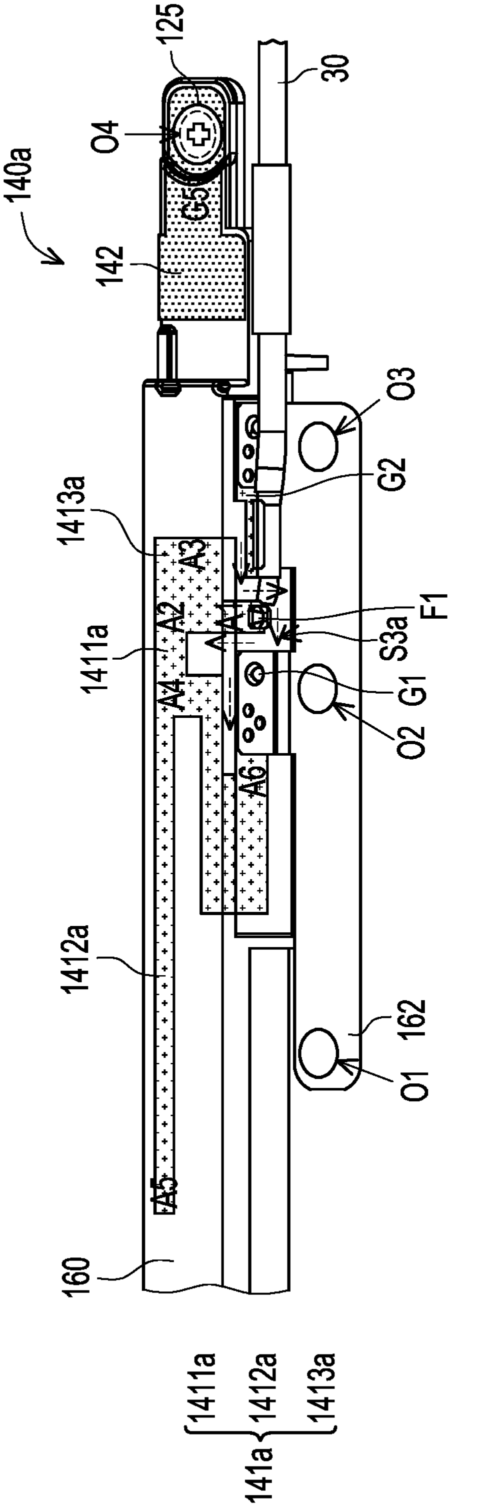
FIG. 9B is a schematic diagram of FIG. 9A from another viewing angle.
Figure 10A:
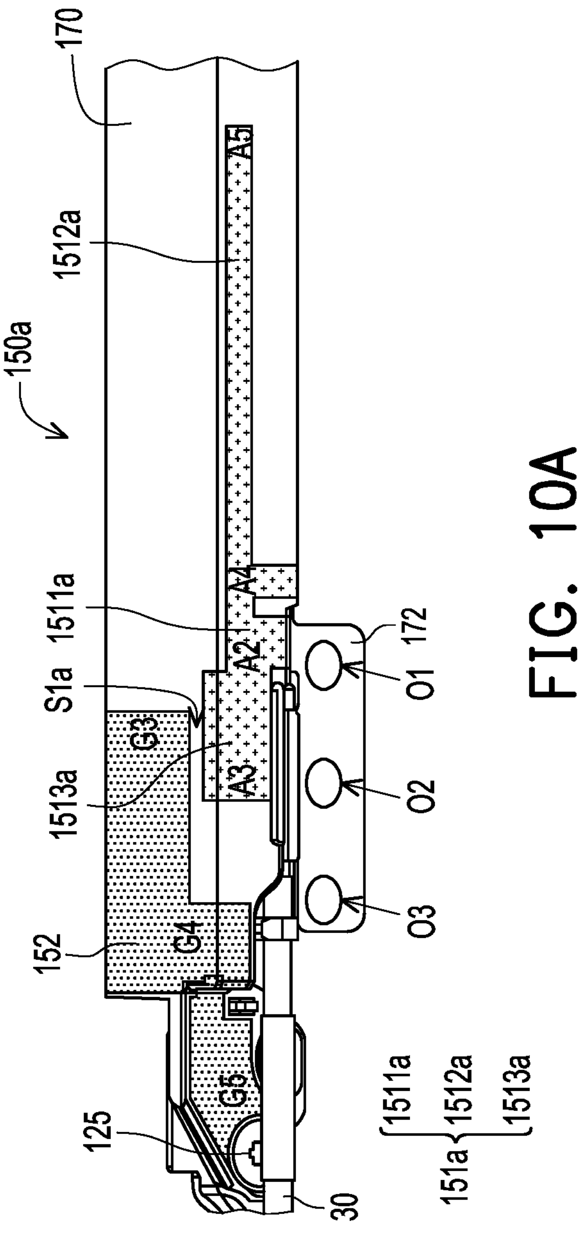
FIG. 10A is a schematic diagram of another embodiment of the antenna module and the antenna bracket on the right side.
Figure 10B:
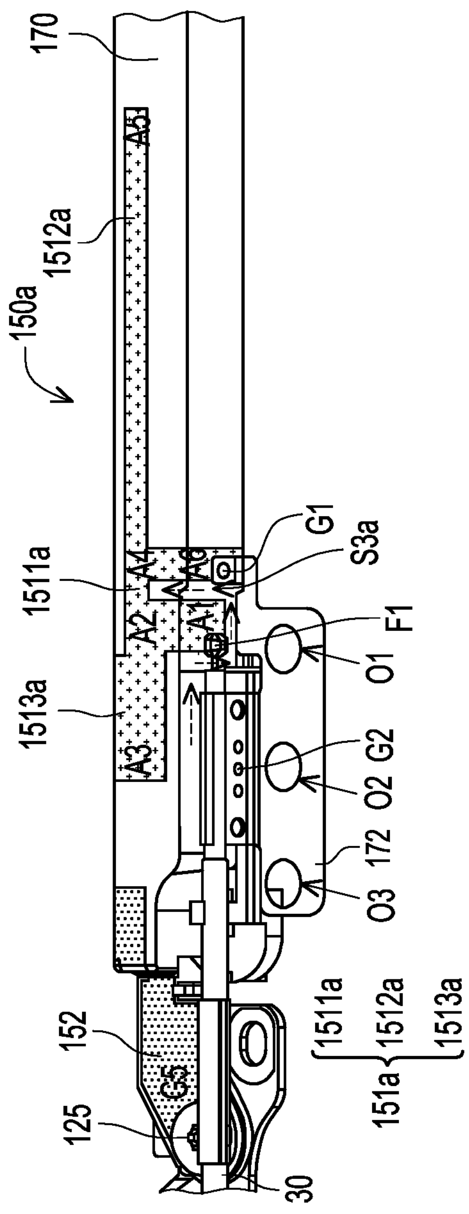
FIG. 10B is a schematic diagram of FIG. 10A from another viewing angle.

FIG. 9A is a schematic diagram of another embodiment of the antenna module and the antenna bracket on the left side. FIG. 9B is a schematic diagram of FIG. 9A from another viewing angle. FIG. 10A is a schematic diagram of another embodiment of the antenna module and the antenna bracket on the right side. FIG. 10B is a schematic diagram of FIG. 10A from another viewing angle. It should be noted that differences between the antenna modules 140*a* and 150*a* of FIG. 9A and FIG. 10A and the antenna modules 140 and 150 of FIG. 3A and FIG. 4A lies in shapes of the radiating parts 141*a* and 151*a* of the antenna modules 140*a* and 150*a*, and the differences are explained below.

Referring to FIG. 9A, FIG. 9B, FIG. 10A and FIG. 10B, a shape of a path area of the position A4 to the position A6 in the first radiator 1411*a* (a path area from the position A1 to the positions A2, A4, A6, G1, G2 in sequence) of the antenna module 140*a*, and shapes of the third radiators 1413*a*, 1513*a* (path areas from the position A2 to the position A3) of the antenna modules 140*a* and 150*a* are different from that of the antenna modules 140 and 150 (FIG. 3B and FIG. 4B). In addition, the antenna modules 140*a* and 150*a* do not include the fourth radiators 1414 and 1514 and the second slot S2 as shown in FIG. 3B and FIG. 4B.

Since the radiating parts 141*a* and 151*a* do not include the fourth radiators 1414 and 1514, in the embodiments of the antenna modules 140 and 150, the first radiators 1411 and 1511 and the fourth radiators 1414 and 1514 commonly generate the third high-frequency band. In the embodiment, the third high-frequency band (6500-7500 MHz) is changed to be commonly generated by the first radiators 1411*a*, 1511*a* and the third radiators 1413*a*, 1513*a*. Namely, in the embodiment, the first radiators 1411*a* and 1511*a* and the third radiators 1413*a* and 1513*a* connected to the first radiators 1411*a* and 1511*a* and extending in the direction of the coupling ground parts 142 and 152 commonly generate the second high-frequency band and the third high-frequency band.

Referring to FIG. 9A and FIG. 10A, the coupling ground parts 142 and 152 of the antenna modules 140*a* and 150*a* are located on one side of the third radiators 1413*a* and 1513*a* respectively, and form a first slot Sla with the third radiators 1413*a* and 1513*a* respectively. Moreover, referring to FIG. 9B and FIG. 10B, the ground conductors G2 of the antenna modules 140*a* and 150*a* are located next to the feeding terminals F1 and the third radiators 1413*a* and 1513*a* respectively, and two third slots S3*a* are formed between the ground conductors G2 and the third radiators 1413*a*, 1513*a* and the first radiators 1411*a*, 1511*a* respectively.

In addition, as shown in FIG. 9B, the third slot S3*a* of the antenna module 140*a* is further formed between the first radiator 1411*a* and the ground terminal G1. Such a design makes the antenna module 140*a* to have better performance.

On the other hand, the impedance matching bandwidths of the antenna modules 140*a* and 150*a* may be adjusted by adjusting the sizes of the first slot S1*a* and the third slot S3*a*.

In summary, the electronic device of the disclosure uses the coupling ground parts, the first metal housing, metal hinges, the second metal housing, and the third metal housing of the two antenna modules to form two loop paths, so that the low frequency of the antenna modules has low directivity and good antenna performance. In addition, in the electronic device, by disposing the antenna modules in a cavity surrounded by the first section and the second section of the first metal housing, Part of the second metal housing, part of the third metal housing and the metal retaining wall, the antenna modules have good performance. Moreover, by disposing the coupling ground parts of the antenna modules between the radiating parts, the isolation of the two antenna modules and the antenna performance are improved. In addition, the radiating parts of the antenna modules may generate the first low-frequency band, the first high-frequency band, the second high-frequency band and the third high-frequency band through the first radiators, the second radiators, the third radiators and the fourth radiators for applying to the frequency band of Wi-Fi 6E. On the other hand, in the antenna module, the impedance matching bandwidth May be increased by adjusting the sizes of the first slot, the second slot and the third slot or the first slot and the third slot. Such design enables the electronic device to have Wi-Fi 6E wideband characteristics, low frequencies with low directivity and good antenna performance.

What is claimed is:

1. An electronic device, comprising:
- a first body, comprising a first metal housing;
- a second body, pivotally connected to the first body through two metal hinges, and comprising a second metal housing, a third metal housing, and a non-metal housing, wherein the non-metal housing is connected to the second metal housing and close to the first body; and
- two antenna modules, disposed between the second metal housing, the third metal housing, and the non-metal housing, and respectively close to the two metal hinges, wherein each antenna module comprises a radiating part and a coupling ground part, the radiating part is located between the coupling ground part and the corresponding metal hinge, the coupling ground part is close to the first metal housing, and the coupling ground part, the first metal housing, the metal hinge, the second metal housing, and the third metal housing together form a loop path.

2. The electronic device as claimed in claim 1, wherein the radiating part comprises a first radiator and a second radiator connected to the first radiator, the first radiator comprises a feeding terminal and a ground terminal located at two opposite ends, the second radiator extends from the first radiator along an edge of the non-metal housing toward the corresponding metal hinge, and the first radiator and the second radiator commonly generate a first low-frequency band and a first high-frequency band.

3. The electronic device as claimed in claim 2, wherein the radiating part further comprises a third radiator connected to the first radiator and extending in a direction away from the second radiator, and the first radiator and the third radiator commonly generate a second high-frequency band.

4. The electronic device as claimed in claim 3, wherein the coupling ground part is located on one side of the third radiator, and forms a first slot with the third radiator.

5. The electronic device as claimed in claim 3, wherein the radiating part further comprises a fourth radiator connected to the first radiator and arranged in parallel with the third radiator, a second slot is formed between the fourth radiator and the third radiator, and the first radiator and the fourth radiator commonly generate a third high-frequency band.

6. The electronic device as claimed in claim 5, wherein the antenna module comprises a ground conductor located on one side of the feeding terminal and the fourth radiator, and a third slot is formed between the ground conductor, the fourth radiator, and the first radiator.

7. The electronic device as claimed in claim 2, wherein the radiating part further comprises a third radiator connected to the first radiator and extending in a direction toward the coupling ground part, and the first radiator and the third radiator commonly generate a second high-frequency band and a third high-frequency band.

8. The electronic device as claimed in claim 7, wherein the antenna module comprises a ground conductor located next to the feeding terminal and the third radiator, and a third slot is formed between the ground conductor, the third radiator and the first radiator.

9. The electronic device as claimed in claim 1, wherein the second body comprises a metal retaining wall extending from the third metal housing toward the second metal housing, the coupling ground part is connected to the metal retaining wall through a metal part, and the metal retaining wall is connected to the second metal housing through a conductor, part of the second metal housing, part of the third metal housing, the metal retaining wall, and part of the first metal housing together surround a cavity, and the radiating part is located in the cavity.

10. The electronic device as claimed in claim 1, wherein the loop path formed by the coupling ground part, the first metal housing, the metal hinge, the second metal housing, and the third metal housing generates a second low-frequency band.

* * * * *